United States Patent
Maturana et al.

(10) Patent No.: US 11,669,758 B2
(45) Date of Patent: Jun. 6, 2023

(54) MACHINE LEARNING DATA FEATURE REDUCTION AND MODEL OPTIMIZATION

(71) Applicant: Rockwell Automation Technologies, Inc., Mayfield Heights, OH (US)

(72) Inventors: Francisco Maturana, Mayfield Heights, OH (US); Phillip LaCasse, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 876 days.

(21) Appl. No.: 16/681,396

(22) Filed: Nov. 12, 2019

(65) Prior Publication Data

US 2021/0142194 A1    May 13, 2021

(51) Int. Cl.
*G06N 5/048* (2023.01)
*G06N 20/00* (2019.01)
*G06N 7/02* (2006.01)

(52) U.S. Cl.
CPC ............. *G06N 5/048* (2013.01); *G06N 7/023* (2013.01); *G06N 20/00* (2019.01)

(58) Field of Classification Search
CPC ............ G06N 5/00; G06N 7/00; G06N 20/00; G06N 10/00; G06N 3/06; G06N 3/0436; G06K 19/0719
See application file for complete search history.

(56) References Cited

U.S. PATENT DOCUMENTS

| | | | | |
|---|---|---|---|---|
| 7,562,054 B2 * | 7/2009 | Huddleston | .......... | G06K 9/6228 706/14 |
| 2002/0184172 A1 * | 12/2002 | Shlain | .................. | G06K 9/6255 706/62 |
| 2005/0049913 A1 | 3/2005 | Huddleston et al. | | |

OTHER PUBLICATIONS

Mokeddem, Ahmed S. "A fuzzy classification model for myocardial infarction risk assessment." Appl. Intel. 2018. 48: pp. 1233-1250 (Year: 2018).*
P.M. Lacasse et al., "A hierarchical, fuzzy inference approach to data filtration and feature prioritization in the connected manufacturing enterprise", Journal of Big Data, vol. 5, No. 45, Nov. 19, 2018, pp. 1-31.
(Continued)

*Primary Examiner* — Li B. Zhen
*Assistant Examiner* — Keith Lucas Kevelson
(74) *Attorney, Agent, or Firm* — Kunzler Bean & Adamson; Scott D. Thorpe

(57) ABSTRACT

For machine learning data reduction and model optimization, a method randomly assigns each data feature of a training data set to a plurality of solution groups. Each solution group has no more than a solution group number k of data features and each data feature is assigned to a plurality of solution groups. The method identifies each solution group as a high-quality solution group or a low-quality solution group. The method further calculates data feature scores for each data feature comprising a high bin number and a low bin number. The method determines level data for each data feature from the data feature scores using a fuzzy inference system. The method identifies an optimized data feature set based on the level data. The method further trains a production model using only the optimized data feature set. The method predicts a result using the production model.

18 Claims, 11 Drawing Sheets

(56) References Cited

OTHER PUBLICATIONS

K.H. Hoou et al., "An improved wrapper-based feature selection for machinery fault diagnosis", PLOS ONE, vol. 12, No. 12, Dec. 20, 2017, pp. 1-10.

P.N. Lacasse et al., "Operationalization of a Machine Learning and Fuzzy Inference-Based Defect Prediction Case Study in a Holonic Manufacturing System", Advances in Databases and Information Systems; Springer International Publishing, Aug. 2, 2019, pp. 96-104.

"Extended European Search Report", EPO, dated May 19, 2021, pp. 1-10.

* cited by examiner

103/105/107

| Data Feature 251 | Data Feature 251 |
|---|---|
| Data Instance 253 | Data Instance 253 |
| Data Instance 253 | Data Instance 253 |

...

| Data Feature 251 | Data Feature 251 |
|---|---|
| Data Instance 253 | Known Result 261 |
| Data Instance 253 | Known Result 261 |

⋮

| Data Instance 253 | Data Instance 253 |
|---|---|

...

| Data Instance 253 | Known Result 261 |
|---|---|

| Data Feature 251 | High Bin Number 255 | Low Bin Number 257 | Level Data 259 | Qualitative Label 263 |
|---|---|---|---|---|
| Data Feature 251 | High Bin Number 255 | Low Bin Number 257 | Level Data 259 | Qualitative Label 263 |
| Data Feature 251 | High Bin Number 255 | Low Bin Number 257 | Level Data 259 | Qualitative Label 263 |
| ⋮ | | | | |
| Data Feature 251 | High Bin Number 255 | Low Bin Number 257 | Level Data 259 | Qualitative Label 263 |

200

| Solution Group Number 201 |
| --- |
| High-Quality Criteria 203 |
| Level Criteria 205 |
| High Bin Threshold 207 |
| Level Threshold 209 |

MACHINE LEARNING DATA FEATURE REDUCTION AND MODEL OPTIMIZATION

BACKGROUND INFORMATION

The subject matter disclosed herein relates to machine learning data feature reduction and model optimization.

BRIEF DESCRIPTION

A method for machine learning data feature reduction and model optimization is disclosed. The method randomly assigns, by use of a processor, each data feature of a training data set to a plurality of solution groups. Each solution group has no more than a solution group number k of data features and each data feature is assigned to a plurality of solution groups. The method identifies each solution group as a high-quality solution group or a low-quality solution group. The method further calculates data feature scores for each data feature comprising a high bin number and a low bin number. The method determines level data for each data feature from the data feature scores using a fuzzy inference system. The method identifies an optimized data feature set based on the level data. The method further trains a production model using only the optimized data feature set. The method predicts a result using the production model.

An apparatus for machine learning data feature reduction and model optimization is also disclosed. The apparatus includes a processor and a memory storing code executable by the processor. The processor randomly assigns each data feature of a training data set to a plurality of solution groups. Each solution group has no more than a solution group number k of data features and each data feature is assigned to a plurality of solution groups. The processor identifies each solution group as a high-quality solution group or a low-quality solution group. The processor further calculates data feature scores for each data feature comprising a high bin number and a low bin number. The processor determines level data for each data feature from the data feature scores using a fuzzy inference system. The processor identifies an optimized data feature set based on the level data. The processor further trains a production model using only the optimized data feature set. The processor predicts a result using the production model.

A computer program product for machine learning data feature reduction and model optimization is disclosed. The computer program product includes a non-transitory computer readable storage medium having program code embodied therein. The program code is readable/executable by a processor. The processor randomly assigns each data feature of a training data set to a plurality of solution groups. Each solution group has no more than a solution group number k of data features and each data feature is assigned to a plurality of solution groups. The processor identifies each solution group as a high-quality solution group or a low-quality solution group. The processor further calculates data feature scores for each data feature comprising a high bin number and a low bin number. The processor determines level data for each data feature from the data feature scores using a fuzzy inference system. The processor identifies an optimized data feature set based on the level data. The processor further trains a production model using only the optimized data feature set. The processor predicts a result using the production model.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a schematic block diagram of a data set according to an embodiment;

DETAILED DESCRIPTION

Figure 1A:
FIGS. 1A-B are a schematic block diagram of machine learning data reduction and model optimization process according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Industrial and other processes generate significant amounts of data features and data that can be analyzed. Unfortunately, there are often so may data features that it is difficult to identify the most relevant data features. The embodiments perform data feature reduction for processes including industrial/manufacturing processes, thereby executing an exhaustive combinatorial search for data features of significance and most suitable machine learning models for executing anomaly prediction. For example, the embodiments may predict product defects in an electronic assembly manufacturing (EAM) operation.

The result of the data feature reduction process is the identification of data features such as process variables that may be selected from a data stream that exists between a physical process and a prediction component during real time operations. For example, the real time operation may be manufacturing of panel in the EAM operation.

The selected optimized data feature set may only be valid for the period in which real-time operations data remains within the tolerance of the of the data set that was used for the feature selection process. As a result, there is a need to rapidly identify the optimized data feature set and reduce the data in the data set used to train a model.

The embodiments described herein rapidly identify the optimized data feature set from data sets and retrain predictive models, allowing the predictive models to be trained for processes in a timely manner.

Figure 1B:
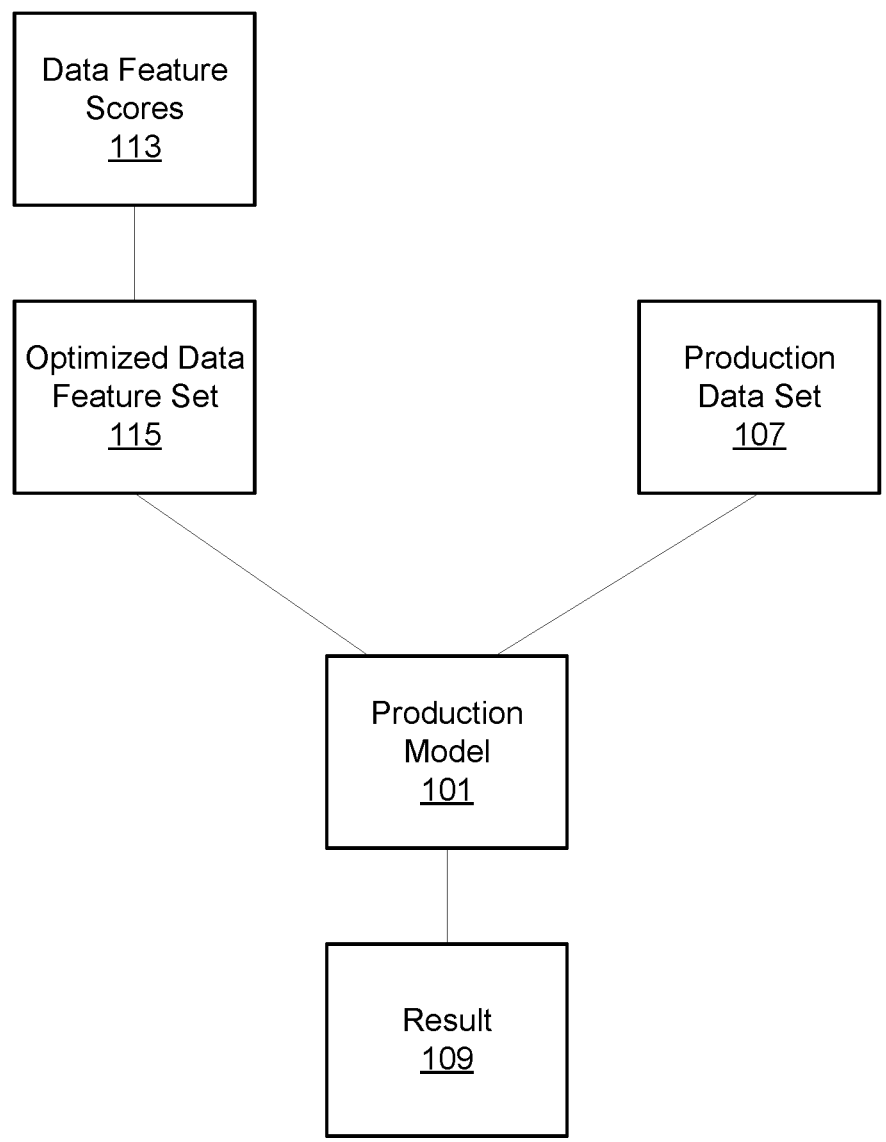

FIGS. 1A-B are a schematic block diagram of machine learning data reduction and model optimization process 100. The process 100 selects an optimized data feature set 115 for a training data set 103 and trains a production model 101 using the optimized data feature set 115. The process 100 may be performed as a background operation, continually retraining the production model 101. As a result, the efficiency of training the production model 101 with a computer is enhanced.

The depicted embodiment includes a training data set 103 and a test data set 105. The training data set 103 and the test data set 105 may be created from a common data set such as inspection data, maintenance data, event data, and the like. In one embodiment, the training data set 103 and the test data set 105 include a known result such as whether a hardware element is functional. The known result may be employed for supervised learning. In an alternate embodiment, the known result may be inferred from the training data set 103 and/or the test data set 105 for unsupervised learning.

The training data set 103 and the test data set 105 include a plurality of data features. The data features may be columns in the data sets 103/105. The process 100 may randomly assign each data feature of the training data set 103 to a plurality of solution groups 111. Each solution group 111 has no more than a solution group number k of data features, where k is a nonzero integer.

The process 100 further trains a plurality of solution models 121. The solution models 121 may be trained with the training data set 103. Each solution model 121 is trained using only the data features of one solution group 111. Because each solution model 121 is only trained using the data features of one solution group 111, the solution model 121 is trained rapidly. In addition, training all of the solution models 121 for each solution group 111 may be significantly faster and/or more efficient than training a single model with all of the data features, improving the efficiency of the process 100 and a computer performing the process.

The process 100 predicts a plurality of results 109 for the test data set 105 using each solution model 121. The process 100 identifies each solution group 111 as one of a high-quality solution group 111a or a low-quality solution group 111b. In one embodiment, a solution group 111 is identified as the high-quality solution group 111a in response to the corresponding result 109 exceeding high-quality criteria. The high-quality criteria will be described hereafter.

The process 100 calculates data feature scores 113 for each data feature. The data feature scores 113 may comprise a high bin number and a low bin number. The high bin number may be the number of high-quality solution groups 111a that the data feature is a member of. The low bin number may be the number of low-quality solution groups 111b that the data feature is a member of. In addition, the process 100 determines level data for each data feature using a fuzzy inference system. The level data may be included in the data feature score 113.

The process 100 identifies the optimized data feature set 115 based on the level data and/or the data feature scores 113. In addition, the process 100 trains a production model 101 using only the optimized data feature set 115. The production model 101 may be trained using only the optimized data feature set 115 of the training data set 103, the test data set 105, and/or another data set such as a production data set 107.

The process 100 predicts one or more results 109 using the production model 101 from a production data set 107. The process 100 may predict whether a given hardware device will fail from the production data set 107 that includes data for the given hardware device using the production model 101. For example, the hardware device may include soldered components. The production data set 107 may include data features related to solder paste deposits for the soldered components. The process 100 may predict a defect prediction result 109 for the hardware device using the production model 101 and data for the hardware device from the production data set 107.

FIG. 2A is a schematic block diagram of a data set 103/105/107. The data set 103/105/107 may be the training data set 103, the test data set 105, and/or production data set 107. The data set 103/105/107 may be organized as a data structure in a memory. In the depicted embodiment, the data set 103/105/107 includes a plurality of data features 251. A data feature 251 may be a data column. Alternatively, the data feature 251 may be a data row. Each data feature 251 is associated with a plurality of data instances 253. In one embodiment, a plurality of data instances 253 may be associated with an element and/or event such as a hardware device and/or operation outcome. For example, one or more rows of data instances 253 may be associated with the hardware device.

In the training data set 103 and/or test data set 105, at least one data feature 251 may include known results 261 for one or more data instances 253. For example, a row of data instances 253 may be associated with a known result 261 such as whether a hardware device corresponding to the row of data instances 253 was functional and/or passed inspection. In one embodiment, the known result 261 is inferred from one or more corresponding data instances 253 for one or more rows.

Figure 2B:
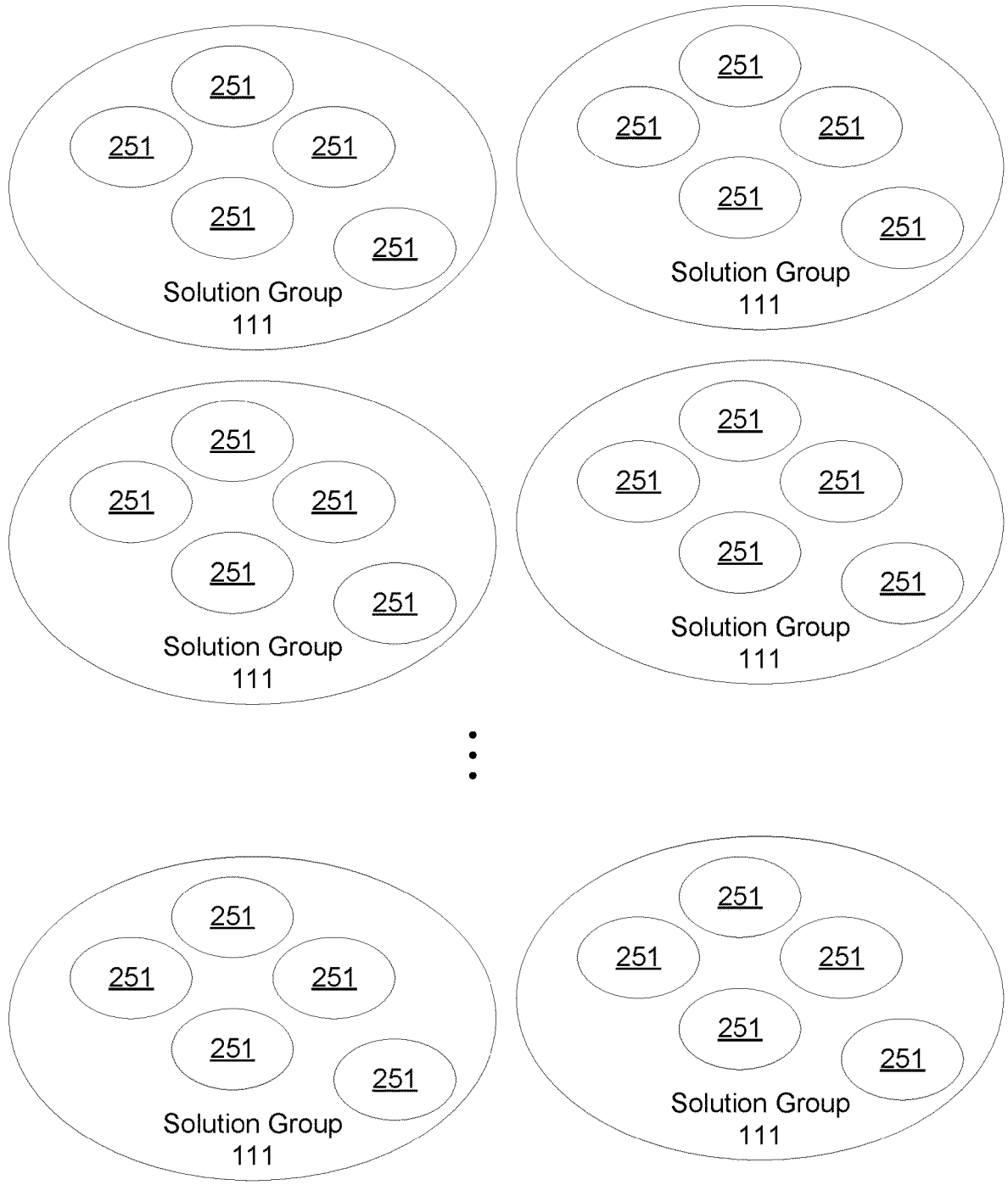
FIG. 2B is a schematic diagram of solution groups according to an embodiment.

FIG. 2B is a schematic diagram of solution groups 111. In the depicted embodiment, each solution group 111 includes the solution group number k of data features 251. Any integer value of k may be employed. In one embodiment, k is in the range of 3 to 10. In the depicted embodiment, the solution group number k is 5. Each data feature 251 is assigned to a plurality of solution groups 111. For example, a given data feature 251 may be assigned to 30 to 300 solution groups 111. In one embodiment, each data feature 251 is assigned to a specified number of solution groups 111. For example, each data feature 251 may be assigned 50 solution groups 111. Alternatively, data features 251 may not be assigned to a same number of solution groups 111. For example, a first data feature 251 may be assigned to 49 solution groups 111 and a second data feature 251 may be assigned to 51 solution groups 111.

In one embodiment, each data feature 251 is assigned to a solution group number (SGN) of solution groups 111 that is calculated using Equation 1, wherein n is a number of data features 251.

$$SGN = \frac{n!}{k!(n-k)!n} \quad \text{Equation 1}$$

Figure 3A:
FIG. 3A is a schematic block diagram of data feature scores according to an embodiment.

FIG. 3A is a schematic block diagram of data feature scores 113. The data features 113 include a plurality of data features 251. In one embodiment, each data feature 251 in a data set 103/105/107 is included. In addition, a corresponding high bin number 255 and low bin number is recorded for each data feature 251. The high bin number 255 may be a sum of high-quality solution groups 111a the data feature 251 is assigned to. The low bin number 257 may be a sum of low-quality solution groups 111b the data feature 251 is assigned to.

In an alternate embodiment, the high bin number 255 is the ratio of high-quality solution groups 111a that the data feature 251 is a member of divided by the total number of solution groups 111 that the data feature 251 is a member of. The low bin number 257 may be the ratio of low-quality solution groups 111b that the data feature 251 is a member of divided by the total number of solution groups 111 that the data feature 251 is a member of.

Level data 259 may be determined for each data feature 251 using a fuzzy inference system. The fuzzy inference system is described hereafter in FIG. 3C. The qualitative label 263 may describe the relevance of the corresponding data feature 251. The qualitative label 263 may be generated by the fuzzy inference system as will be described hereafter.

Figure 3B:
FIG. 3B is a schematic block diagram of hyperparameters according to an embodiment.

FIG. 3B is a schematic block diagram of hyperparameters 200. The hyperparameters 200 may be used to assign the solution groups 111 and identify the optimized data feature set 115. The hyperparameters 200 may be organized as a data structure in a memory. In the depicted embodiment, the hyperparameters 200 include the solution group number k 201, the high-quality criteria 203, level criteria 205, a high bin threshold 207, and a level threshold 209.

The high-quality criteria 203 determines whether a solution group 111 is a high-quality solution group 111a. The high-quality criteria 203 may be an average correct results threshold. The average correct results threshold may specify average correct results 109 for a solution model 121 trained with the solution group 111 when operating on the test data set 105. If the average correct results 109 of the solution group 111 exceeds the average correct results threshold, the solution group 111 may be a high-quality solution group 111a. If a solution group 111 is not a high-quality solution group 111a, the solution group 111 may be a low-quality solution group 111b.

The level criteria 205 may specify a level value 259 based on a crisp value from the fuzzy inference system. Table 1 shows exemplary crisp value ranges and corresponding level values 259.

TABLE 1

| Crisp Values | Level Value 259 |
|---|---|
| 0.51-1.00 | 1 |
| 0.26-0.50 | 2 |
| 0.16-0.25 | 3 |
| 0.06-0.15 | 4 |
| 0-0.05 | 5 |

The high bin threshold 207 may be used to determine if a solution group 111 is a high-quality solution group 111a. In one embodiment, if an average, mean, and/or median of the predicted correct results 109 for the test data set 105 by the solution model 121 trained with the solution group 111 exceeds the high bin threshold 207, the solution group 111 is a high-quality solution group 111a.

The level threshold 209 may be used to determine if a solution group 111 is a high-quality solution group 111a. If the level data 259 exceeds the level threshold 209, the solution group 111 may be a high-quality solution group 111a.

Figure 3C:
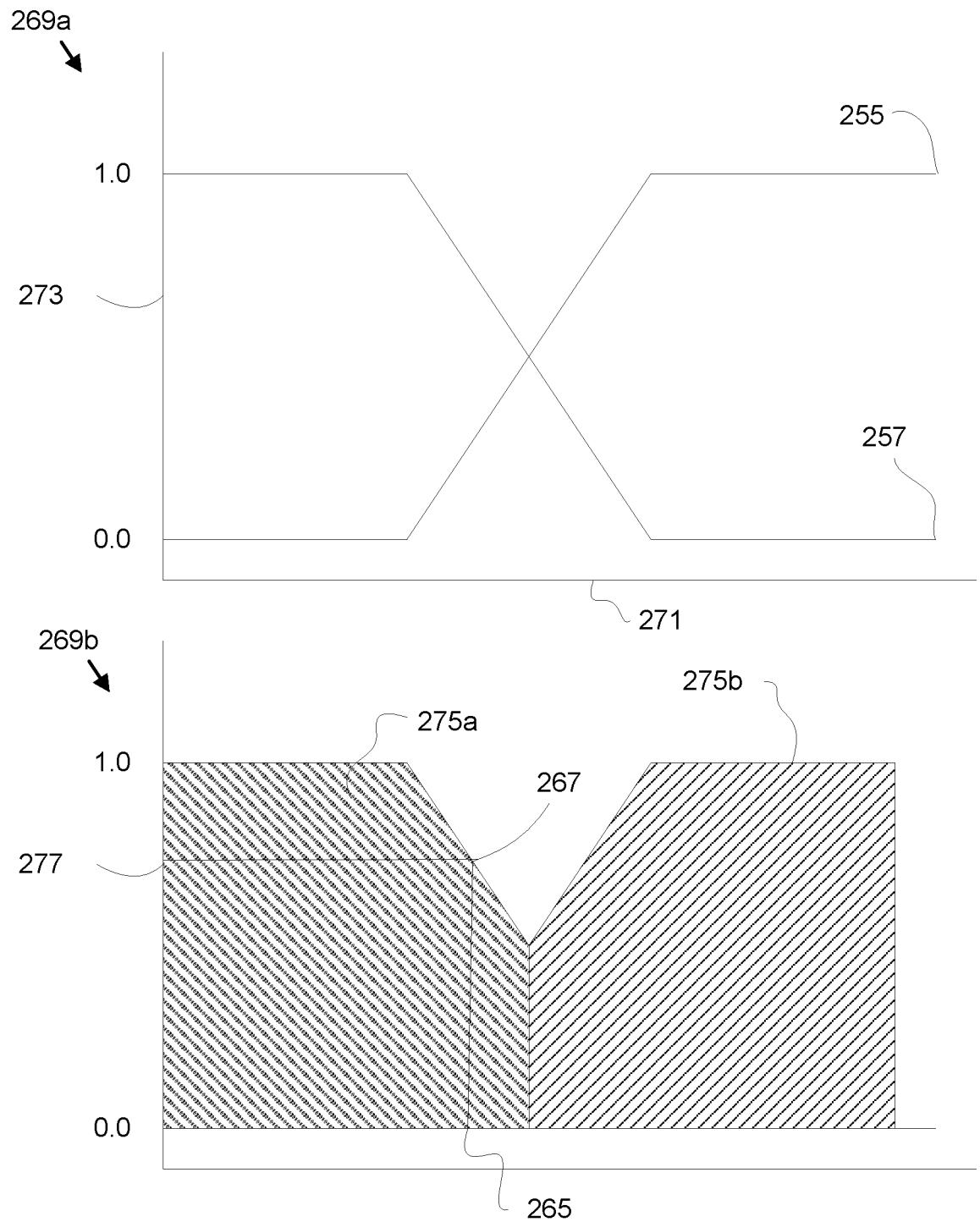
FIG. 3C is a diagram of a fuzzy inference system according to an embodiment.

FIG. 3C is a diagram of the fuzzy inference system 269. The fuzzy inference system 269a shows one exemplary embodiment of a high-quality likelihood 271 that a solution group 111 is a high-quality solution group 111a as a function of the high bin number 255 and the low bin number 257. As the high bin number 255 increases in total solution group ratio 273, the high-quality likelihood 271 increases. The total solution group ratio 273 is the high bin number 255 divided by the sum of the high bin number 255 and the low bin number 257 for the high bin number 255 and the low bin number 257 divided by the sum of the high bin number 255 and the low bin number 257 for the low bin number 257. Similarly, as the low bin number 257 decreases in total solution group ratio 273, the high-quality likelihood 271 that the solution group 111 is a high-quality solution 111a increases.

The fuzzy inference system 269b further shows an aggregated membership functions 275a for the low-quality solution groups 111b and an aggregated membership functions 275b for the high-quality solution groups 111a derived from the fuzzy inference system 269a. The aggregated membership functions 275 may be based on fuzzy inference rules for the fuzzy inference system 269. For a given low-quality bin percentage 265, the aggregated membership functions 275 indicate a crisp value 267 that indicates the likelihood 277 that a solution group 111 is a low-quality solution group 111b. The crisp value that indicates the likelihood that the solution group 111 is a high-quality solution group 111a is an inverse of the likelihood 277 of depicted crisp value 267. The crisp value 267 may be used to assign the qualitative labels 263.

Figure 4A:
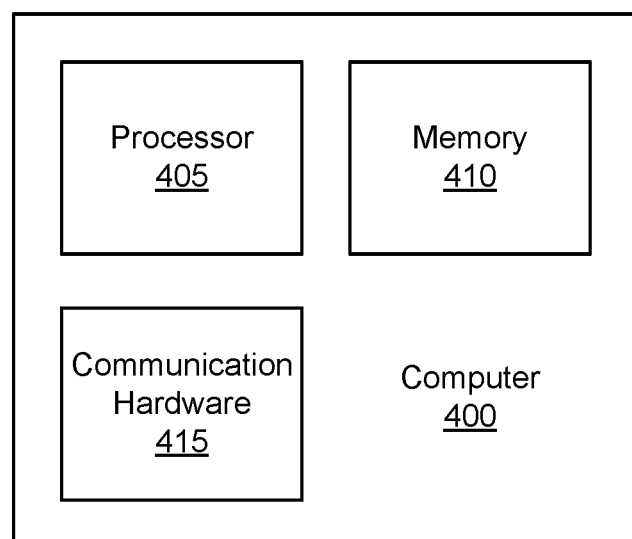
FIG. 4A is a schematic block diagram of a computer according to an embodiment.

FIG. 4A is a schematic block diagram of a computer 400. In the depicted embodiment, the computer 400 includes a processor 405, a memory 410, and communication hardware 415. The memory 410 may include a semiconductor storage device, a hard disk drive, an optical storage device, or combinations thereof. The memory 410 may store code. The processor 405 may execute the code. The communication hardware 415 may communicate with other devices.

Figure 4B:
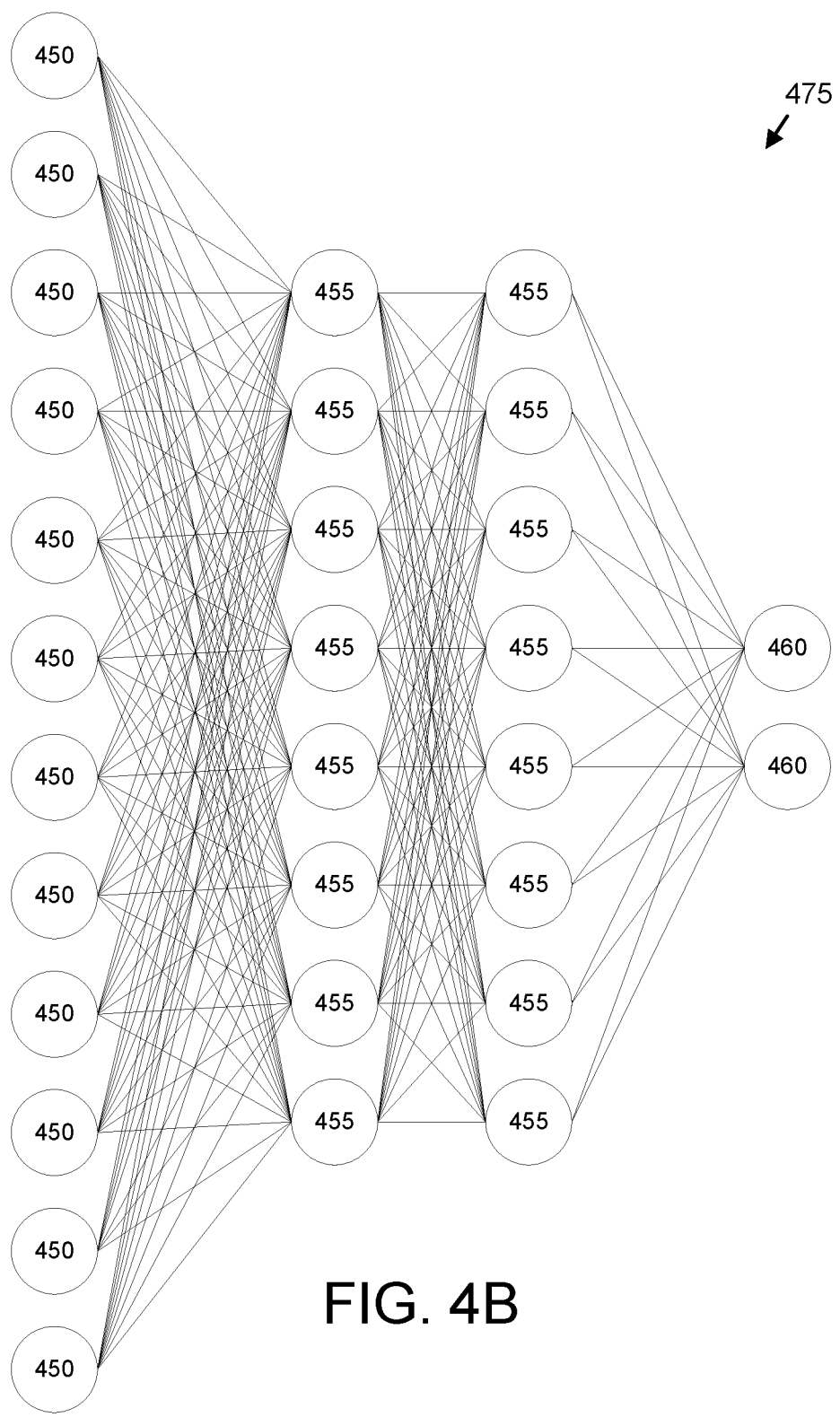
FIG. 4B is a schematic block diagram of a neural network according to an embodiment.

FIG. 4B is a schematic block diagram of a neural network 475. In the depicted embodiment, the neural network 475 includes input neurons 450, hidden neurons 455, and output neurons 460. The neural network 475 may be organized as a convolutional neural network, a recurrent neural network, long short term memory network, and the like.

The neural network 475 may be trained with training data. The training data may include the data instances 253 of the optimized data feature set 115. The neural network 475 may be trained using one or more learning functions while applying the training data to the input neurons 450 along with corresponding known values 261 for the output neurons 460. Subsequently, the neural network 465 may receive data instances 253 from the production data set 107 at the input neurons 450 and predict results 109 at the output neurons 460 based on the actual data.

Figure 5A:
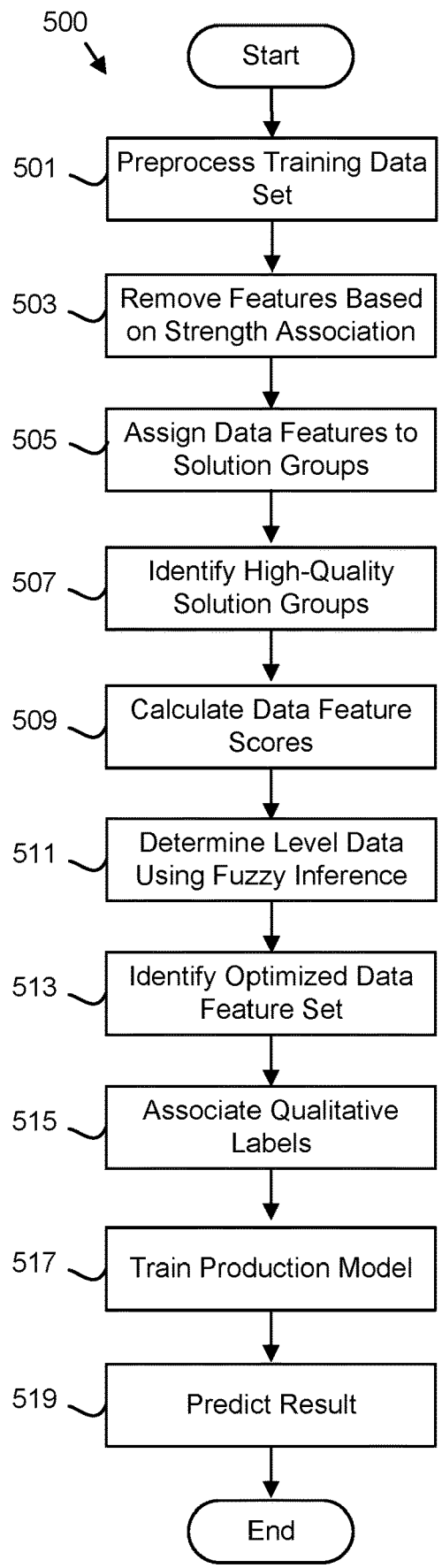
FIG. 5A is a schematic flow chart diagram of a machine learning data reduction and model training method.

FIG. 5A is a schematic flow chart diagram of a machine learning data reduction and model training method 500. The method 500 may train the production model 101 and predict results 109 using the production model 101. The method 500 may be performed by the computer 400 and/or neural network 475.

The method 500 starts, and in one embodiment, the processor 405 preprocesses 501 the training data set 103. The processor 405 may remove rows of data with missing data instances 253, remove data features 251 with missing data instances, or the like. In a certain embodiment, the processor 405 generates substitute values for missing data instances 253.

The processor 405 may remove 503 data features 251 from the training data set 103 based on sequential application of statistical significance of a strength association for each data feature 251. In one embodiment, data features 251 and corresponding data instances 253 that are not statistically significant are removed 503 from the training data set 103. In addition, data features 251 and corresponding data instances 253 with a Bayesian predictive probability that is less than a Bayesian threshold may be removed 503 from the training data set 103.

The processor 405 may assign 505 each data feature 251 of the training data set 103 to a plurality of solution groups 111. The data features 251 may be randomly assigned 505 to the plurality of solution groups 111. Each solution group 111 has no more than the solution group number k 201 of data features 251. In addition, each solution group 111 may have the solution group number k 201 of data features 251.

The processor 405 may identify 507 each solution group 111 as a high-quality solution group 111a or a low-quality solution group 111b. The high-quality criteria 203 may be used to identify whether a solution group 111 is a high-quality solution group 111a or a low-quality solution group 111b. The identification 507 of each solution group 111 as a high-quality solution group 111a or a low-quality solution group 111b is described in more detail in FIG. 5B.

The processor 405 calculates 509 the data feature scores 113 for each data feature 251. The processor 405 may sum the number of high-quality solution groups 111a that a data feature 251 is a member of as the high bin number 255 and sum the number of low-quality solution groups 111b that the data feature 251 is a member of as the low bin number 257.

The processor 405 may further determine 511 a corresponding level value 259 for each data feature 251. The level data 259 may be determined by the fuzzy inference system 269 from crisp values 267 generated from the aggregated membership functions 275 based on the high bin number 255 and the low bin number 257. The processor 405 may process the high bin number 255 and low bin number 257 with the fuzzy inference system 269 to determine the crisp value 267 and likelihood 277 that a solution group 111 is a low-quality solution group 111b or a high-quality solution group 111a. The crisp value 267 and/or likelihood 277 may be used with a lookup table such as Table 1 to determine 511 the level value 259.

The processor 405 may identify 513 the optimized data feature set 115 based on the data feature scores 113. In one embodiment, each data feature 251 with level data 259 that exceeds the level threshold 209 may be identified 513 as included in the optimized data feature set 115. Alternatively, each data feature 251 with a high bin number 255 that exceeds the high bin threshold 207 may be identified 513 as included in the optimized data feature set 115.

In one embodiment, a specified number of data features 251 with the greatest high bin number 255 and/or level data 259 are identified 513 as the optimized data feature set 155. For example, the processor 405 may identify 513 the five data features 251 with the greatest level data 259 and/or high bin number 255 as the optimized data feature set 115.

The processor 405 may associate 515 a qualitative label 263 to each data feature 251 through the fuzzy inference system 269. In one embodiment, the crisp value 267 is used to associate 515 the qualitative label 263 as shown in exemplary table 2.

TABLE 2

| Crisp Value 267 | Qualitative Label 263 |
| --- | --- |
| 0.51-1.00 | High |
| 0.26-0.50 | Good |
| 0.16-0.25 | Moderate |
| 0.06-0.15 | Marginal |
| 0-0.05 | Low |

The processor 405 may train 517 the production model 101 with the training data set 103 and/or test data set 105 using only the data features 251 of the optimized data feature set 115. The processor 405 may train 517 the production model 101 in a background operation and/or while a monitored process is active. Because the production model 101 is trained 517 with only the data features 251 of the optimized data feature set 115, the production model 101 may be trained 517 more rapidly and efficiently, improving the efficiency of the processor 405, computer 400, and/or neural network 475 and supporting real-time training 517 of the production model 101.

The production model 101 may predict 519 one or more results 109 for the production data set 107 using the production model 101. The production model 101 is rapidly available for use, and can be retrained as a monitored process such as a manufacturing line drifts. As a result, the production model 101 and computer 400 executing the production model 101 may more accurately predict 519 the results 109 as the production model 101 is timely trained 517 with the latest test data set 103.

Figure 5B:
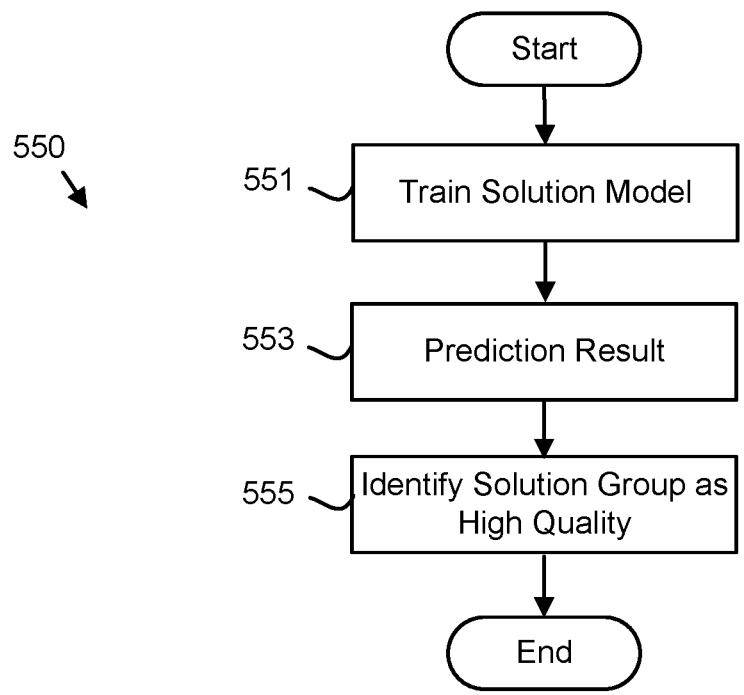
FIG. 5B is a schematic flow chart diagram of a solution group identification method according to an embodiment.

FIG. 5B is a schematic flow chart diagram of a solution group identification method 550. The method 550 may identify solution groups 111 as high-quality solution groups 111a or low-quality solution groups 111b. The method 550 may perform step 507 of FIG. 5A. The method 550 may be performed by the computer 400 and/or neural network 475.

The method 550 starts, and in one embodiment, the processor 405 trains 551 a plurality of solution models 121. Each solution model 121 is trained with only the data features 251 of one solution group 111. For example, a first solution model 121 may be trained 551 using on the data features 251 of a first solution group 111.

The processor 405 may further predict 553 one or more results 109 for the test data set 105 using the solution model 121. In one embodiment, the solution model 121 predicts 553 a result 109 for each row of the test data set 105.

The processor 405 may identify 555 the solution group 111 as the high-quality solution group 111a or the low-quality solution group 111b based on the results 109 and the method 550 ends. The processor 405 may compare each predicted result 109 with a corresponding known result 261. If the predicted result 109 agrees with the corresponding known result 261, the predicted result 109 is correct.

In one embodiment, the processor 405 calculates average correct results for each solution group 111. For example, if the test data set 105 includes m data instances 253, the average correct results (ACR) for a data feature 251 may be calculated using Equation 2, where $a_i$ is one for a correct result 109 and zero for an incorrect result 109.

$$\text{ACR} = (\Sigma_{i=1}^{m} a_i)/m \qquad \text{Equation 2}$$

If the average correct results calculated with Equation 2 exceeds the average correct results threshold of the high-quality criteria 203, the solution group 111 may be a high-quality solution group 111a. If the percentage of correctly predicted results 109 does not exceed the average correct results threshold of the high-quality criteria 203, the solution group 111 may be a low-quality solution group 111b.

In one embodiment, the processor 405 employs the neural network 475 to identify 555 each solution group 111 as a high-quality solution group 111a or a low-quality solution group 111b.

Problem/Solution

During many processes such a manufacturing operations, the process may drift over time. As a result, data features 251 that were useful in predicting results 109 based on a training data set 103 during a first period may be less useful in predicting results 109 during a second period. Unfortunately, a production model 101 may require an unrealistically long time to train if all the data features 251 of a very large set of data features 251 are used to train the production model 101. The embodiments quickly identify the optimized data feature set 115 and train the production model 101 using the optimized data feature set 115. As a result, the production model 101 may be regularly updated during a process such as a manufacturing. Thus, the production model 101 may be retrained in real time and may predict more accurate results, improving the efficiency of the production model 101, the computer 400, and/or the neural network 475.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
randomly assigning, by use of a processor, each data feature of a data feature set for a training data set to a plurality of solution groups, wherein each solution group has no more than a solution group number k of data features and each data feature is assigned to a plurality of solution groups;
identifying each solution group as a high-quality solution group or a low-quality solution group by:
training a plurality of solution models, wherein each solution model is trained with only the data features of the solution group,
predicting results for a test data set using the solution models, and
identifying the solution group as the high-quality solution group or the low-quality solution group based on the results;
calculating data feature scores for each data feature comprising a high bin number and a low bin number, wherein the high bin number is a sum of high-quality solution groups each data feature is assigned to and the low bin number is a sum of low-quality solution groups each data feature is assigned to;
determining level data for each data feature from the data feature scores using a fuzzy inference system;
identifying an optimized data feature set based on the level data;
training a production model using the optimized data feature set; and
predicting a result using the production model.

2. The method of claim 1, wherein each solution group is identified as the high-quality solution group in response to corresponding results exceeding high-quality criteria.

3. The method of claim 1, wherein the level data is determined by the fuzzy inference system from crisp values generated from an aggregated membership function based on the high bin number and the low bin number.

4. The method of claim 3, the method further comprising associating a qualitative label to each data feature through the fuzzy inference system.

5. The method of claim 1, the method further comprising removing data features from the data feature set based on a sequential application of statistical significance of a strength association for each data feature.

6. The method of claim 1, wherein the result is a defect prediction for a hardware device.

7. An apparatus comprising:
a processor;
a memory storing code executable by the processor to:
randomly assign each data feature of a data feature set for a training data set to a plurality of solution groups, wherein each solution group has no more than a solution group number k of data features and each data feature is assigned to a plurality of solution groups;
identify each solution group as a high-quality solution group or a low-quality solution group by:
training a plurality of solution models, wherein each solution model is trained with only the data features of the solution group,
predicting results for a test data set using the solution models, and identifying the solution group as the high-quality solution group or the low-quality solution group based on the results;
calculate data feature scores for each data feature comprising a high bin number and a low bin number, wherein the high bin number is a sum of high-quality solution groups each data feature is assigned to and the low bin number is a sum of low-quality solution groups each data feature is assigned to;
determine level data for each data feature from the data feature scores using a fuzzy inference system;
identify an optimized data feature set based on the level data;
train a production model using the optimized data feature set; and
predict a result using the production model.

8. The apparatus of claim 7, wherein each solution group is identified as the high-quality solution group in response to corresponding results exceeding high-quality criteria.

9. The apparatus of claim 7, wherein the level data is determined by the fuzzy inference system from crisp values generated from an aggregated membership function based on the high bin number and the low bin number.

10. The apparatus of claim 9, the processor further associating a qualitative label to each data feature through the fuzzy inference system.

11. The apparatus of claim 7, the processor further removing data features from the data feature set based on a sequential application of statistical significance of a strength association for each data feature.

12. The apparatus of claim 7, wherein the result is a defect prediction for a hardware device.

13. A computer program product comprising a non-transitory computer readable storage medium having program code embodied therein, the program code readable/executable by a processor to:
randomly assign each data feature of a data feature set for a training data set to a plurality of solution groups, wherein each solution group has no more than a solution group number k of data features and each data feature is assigned to a plurality of solution groups;
identify each solution group as a high-quality solution group or a low-quality solution group by:
training a plurality of solution models, wherein each solution model is trained with only the data features of the solution group,
predicting results for a test data set using the solution models, and
identifying the solution group as the high-quality solution group or the low-quality solution group based on the results;
calculate data feature scores for each data feature comprising a high bin number and a low bin number, wherein the high bin number is a sum of high-quality solution groups each data feature is assigned to and the low bin number is a sum of low-quality solution groups each data feature is assigned to;
determine level data for each data feature from the data feature scores using a fuzzy inference system;
identify an optimized data feature set based on the level data;
train a production model using the optimized data feature set; and
predict a result using the production model.

14. The computer program product of claim 13, wherein each solution group is identified as the high-quality solution group in response to corresponding results exceeding high-quality criteria.

15. The computer program product of claim 13, wherein the level data is determined by the fuzzy inference system from crisp values generated from an aggregated membership function based on the high bin number and the low bin number.

16. The computer program product of claim 15, the processor further associating a qualitative label to each data feature through the fuzzy inference system.

17. The computer program product of claim 13, the processor further removing data features from the data feature set based on a sequential application of statistical significance of a strength association for each data feature.

18. The computer program product of claim 13, wherein the result is a defect prediction for a hardware device.

* * * * *